Patented Sept. 3, 1940

2,213,641

UNITED STATES PATENT OFFICE 2,213,641

CLEANING POWDER

Urlyn C. Tainton, Baltimore, Md.

No Drawing. Application April 25, 1939,
Serial No. 270,019

1 Claim. (Cl. 252—89)

The present invention is a continuation in part of an application filed by me April 5, 1934, Serial No. 719,205.

The invention relates to cleaning powders and methods for preparing the same.

It is an object of the present invention to provide cleaning powders and methods of preparing the same which can be used for removing from delicate fabrics spots or stains such as are caused by oil, grease, fruit juices, coffee, perspiration or the like without leaving a ring or any other trace of the spot.

It is also an object of the invention to provide highly efficient cleaning powders which will be found particularly advantageous and desirable for cleaning silk, wool, felt hats or furs, rugs, upholstery and other fabrics and articles. In order that the advance in the art of cleaning powders over the prior art may be clearly understood, the following explanation is made.

In the past, cleaning powders designed for the purposes mentioned above have consisted of natural materials such as fuller's earth, kaolin, powdered talc or similar substances. Actually these cleaning powders function by virtue of the phenomenon of adsorption whereby certain substances will condense upon the surface of the adsorbing material a layer of molecules of gas, liquid or solid. Since this effect depends essentially upon the surface area, it has been the custom to employ very finely divided powders in an effort to secure the maximum result.

According to the present invention, however, use is made of substances which have in themselves a cellular porous or sponge-like structure and so present a large surface area even though the individual particles may not themselves be extremely fine. It is known, for example, that charcoal, which is an excellent adsorbent for certain gases and liquids may present an area of 1000 square metres for each cubic centimetre. Obviously charcoal could not be used as a cleaning powder, but according to the present invention substances are employed which have a structure similar to, and a surface area comparable with, that of charcoal. In this way it is possible to obtain very greatly improved results in the removal of stains and spots from fabrics without employing powder in an extremely fine state of sub-division.

Another limitation of the powders previously used is that in general an adsorbent is specific in its adsorption of single classes of substances, as, for example, either acidic or basic substances. Consequently powders homogeneous in composition will not in general be applicable to both types of substances. It is an object of the present invention to provide powders which will adsorb both acidic and basic substances and so be of general utility regardless of the type of stain to be removed. The desired result may be attained by combining adsorbents of two different types, or it may in specific cases be reached by the employment of substances which are amphoteric in character, i. e., can function either as an acid or a base. Examples of the latter type are aluminium oxide, $Al_2O_3$ and stannic oxide $SnO_2$. Since alumina does not adsorb all basic substances as readily as it does acid substances, it is sometimes desirable to combine it with silica $SiO_2$ which is specific in its adsorption of basic dyes. Alternatively, instead of silica, the aluminium may be combined with a zeolite consisting of a sodium aluminium silicate or similar substance.

This invention includes a cleaning powder which comprises aluminium oxide or a mixture containing aluminium oxide in the porous or sponge-like form with a substance, also in the porous or sponge-like form, which is capable of adsorbing basic dyes.

The aluminium oxide is preferably formed synthetically by methods which will produce the maximum development of surface area. These methods include the precipitation of the material in the form of a gel, which is then dried and powdered. An alternative method may consist in treatment of an aluminium surface with a small quantity of mercury, which brings about the oxidation of the aluminium metal and the production of an aluminium oxide of extremely high adsorptive capacity.

The material capable of adsorbing basic dyes may conveniently have a basis of silica.

The amount of aluminium oxide or its equivalent is preferably over 30% by weight of the cleaning powder, and the substance is conveniently made by the co-precipitation of aluminium hydroxide or stannous hydroxide with silica or a silicate.

The cleaning powder made in accordance with the present invention may further comprise an intimate mixture of free, activated aluminium oxide with diatomaceous earth, silica gel or anhydrous aluminium silicate in powdered form, the proportion of aluminium oxide amounting to at least 30% of the mixture.

The following is a description by way of example of one method of preparing cleaning powder in accordance with the present invention:

A solution of aluminium sulphate is prepared having a specific gravity of 1.22 at 22° C.

A solution of sodium aluminate is prepared having a specific gravity of 1.1172 at 34° C.

A solution of sodium silicate of approximate composition 9% $Na_2O$ and 29% $SiO_2$ is diluted with water to a specific gravity of 1.210 at 21.5° C.

375 cc. of the sodium aluminate solution and 250 cc. of the sodium silicate solution are run simultaneously into 310 cc. of the aluminium sulphate solution with constant stirring. The product is filtered, washed with warm water and dried at a temperature of about 400° C. A cleaning powder is a resultant of this process. As an alternative, the product can be filtered and dried before washing, and must then be dried at the same temperature. Another method of preparing a cleaning powder in accordance with this invention is as follows. A solution of hydrochloric acid is prepared by diluting 1200 cc. of concentrated hydrochloric acid (sp. gr. 1.18–1.19) with 600 cc. of water.

4660 cc. of the sodium aluminate solution (as prepared in the previous example) are mixed with 2070 cc. of the sodium silicate solution (previously described) diluted with an equal volume of water and 1800 cc. of the hydrochloric acid solution added with agitation. The final mixture is then made slightly alkaline by the addition of ammonium hydroxide solution until the product is just alkaline in reaction to phenolphthalein. The product is filtered and dried at a temperature of approximately 400° C. and may be washed with warm water either before or after this drying. If washing is performed after drying, an additional similar drying operation is required. A cleaning powder in accordance with the invention is thereby prepared.

It will be understood that the cleaning substance may be agglomerated into cake or crayon form.

The specified substances, concentrations and conditions stated in the above examples are for purposes of illustration only and not by way of limitation, and modifications embraced by the appended claim are contemplated in this invention.

What is claimed is:

A cleaning powder consisting of at least 30% of synthetic alumina in the adsorbent form together with an adsorbent selected from the group consisting of synthetic zeolite, fuller's earth, diatomaceous earth, gelatinous silica and hydrous aluminium silicate in powdered form.

URLYN C. TAINTON.